J. M. WEED.
WELDING ELECTRODE.
APPLICATION FILED MAY 7, 1918.

1,300,068.

Patented Apr. 8, 1919.

Inventor:
James M. Weed,
by Albert G. Davis
His Attorney.

UNITED STATES PATENT OFFICE.

JAMES M. WEED, OF SCHENECTADY, NEW YORK, ASSIGNOR TO GENERAL ELECTRIC COMPANY, A CORPORATION OF NEW YORK.

WELDING-ELECTRODE.

1,300,068.            Specification of Letters Patent.      Patented Apr. 8, 1919.

Application filed May 7, 1918. Serial No. 233,017.

*To all whom it may concern:*

Be it known that I, JAMES M. WEED, a citizen of the United States, residing at Schenectady, in the county of Schenectady, State of New York, have invented certain new and useful Improvements in Welding-Electrodes, of which the following is a specification.

The present invention comprises an improvement in electric resistance welding electrodes, and particularly to electrodes for carrying out spot welding.

When carrying out spot welding operations it is desirable that the electrodes through which the welding electrode and the welding pressure are applied should be smooth so as to make good electrical and thermal contact with the work. It is found during the use of such electrodes, particularly when welding heavy stock, that the surface of the electrodes in contact with the work soon becomes roughened due to oxidation and also to uneven electrical contact which is particularly marked as the surface of the work is more or less covered with scale and dirt. This effect is accumulative since roughening and oxidation of the surface of the electrode of one welding operation results in a poorer electrical contact for the next operation. Heretofore the electrodes have been cleaned and smoothed from time to time between welding operations by removing the surface layer in any convenient way, for example, by filing. The result is a progressive wearing down of the surface of the electrode. When the electrode end has the shape of a truncated cone or pyramid, this mechanical removal of the metal at the contact end of the electrode has the effect of increasing the contact surface so that finally the sides of the electrodes must be turned off to bring it back to its original shape. These operations not only consume time and cause trouble, but are a source of expense as the electrodes require more rapid replacement.

In accordance with my invention, the electrodes are provided at their ends with a separable cap which receives all the wear and oxidation which would otherwise be exerted upon the surface of the electrode itself. When the surface of this separable cap becomes worn and oxidized it is removed at comparatively small expense and replaced by a new one, thereby preserving the electrode itself in good condition. The metal of the cap of course may be used over again in the manufacture of new caps.

Figure 1:
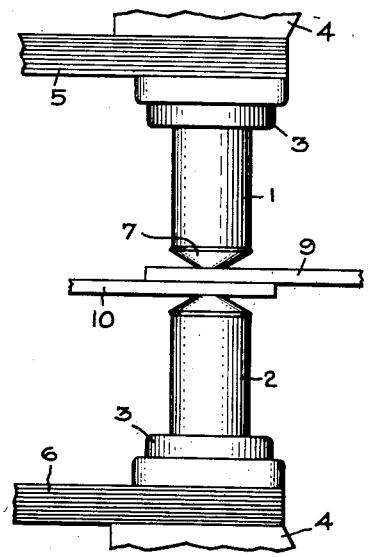
Figure 2:
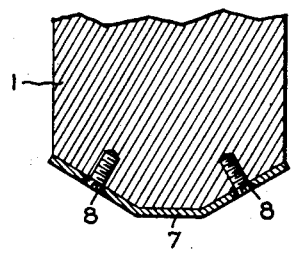

My invention is illustrated in the accompanying drawing in which Figure 1 shows a pair of electrodes applied in welding relation to two plates to be united, and Fig. 2 is a sectional view showing the arrangement of the cap on the electrode.

Fig. 1 shows two welding electrodes 1 and 2 which set in a base 3 fastened to a frame 4 of the welding machine and supplied respectively with current by flexible conductors 5 and 6. As shown in Fig. 2, a separable cap 7 of relatively thin metal is fastened to the ends of the electrodes in any convenient way, for example, by means of screws 8. The electrodes are applied to the work, as shown in Fig. 1, as consisting of lapped plates 9 and 10. A good electrical and thermal contact is maintained between the separable tip and electrode proper as the welding current is applied while heavy pressure is exerted between the electrodes.

What I claim as new and desire to secure by Letters Patent of the United States, is:—

1. An electric spot welding electrode comprising a stem consisting of copper having a welding face on an end, a separable tip and means for removably connecting said tip to said stem at points removed from the welding face of said tip.

2. An electric spot welding electrode comprising a stem consisting of copper and having a truncated end, a separable tip therefor, and means acting on the sides of said truncated end for holding said tip in fixed relation to said stem.

In witness whereof, I have hereunto set my hand this 2nd day of May 1918.

JAMES M. WEED.